United States Patent
Nagata et al.

[11] Patent Number: 6,122,030
[45] Date of Patent: Sep. 19, 2000

[54] INSULATING-FILM LAYER AND SEALANT ARRANGEMENT FOR PROTECTIVE CIRCUIT DEVICES IN A LIQUID CRYSTAL DISPLAY DEVICE

[75] Inventors: Hisashi Nagata, Nara; Takayuki Shimada, Yamatokoriyama; Naofumi Kondo, Ikoma, all of Japan

[73] Assignee: Sharp Kabushiki Kaisha, Osaka, Japan

[21] Appl. No.: 08/958,089

[22] Filed: Oct. 27, 1997

[30] Foreign Application Priority Data

Nov. 28, 1996 [JP] Japan .................................. 8-318319

[51] Int. Cl.[7] .......................... G02F 1/1339; G02F 1/1333
[52] U.S. Cl. ............................................... 349/153; 349/40
[58] Field of Search ........................................ 349/40, 153

[56] References Cited

U.S. PATENT DOCUMENTS

| | | | |
|---|---|---|---|
| 5,068,748 | 11/1991 | Ukai et al. . | |
| 5,200,876 | 4/1993 | Takeda et al. | 361/91 |
| 5,323,254 | 6/1994 | Pitt | 359/60 |
| 5,373,377 | 12/1994 | Ogawa et al. | 359/59 |
| 5,671,026 | 9/1997 | Shiraki et al. | 349/40 |
| 5,852,480 | 12/1998 | Yajima et al. | 349/40 |
| 5,946,057 | 8/1999 | Kusanagi | 349/40 |

FOREIGN PATENT DOCUMENTS

| 106788 | 5/1988 | Japan . |
|---|---|---|
| 07318980 | 3/1995 | Japan . |

Primary Examiner—William L. Sikes
Assistant Examiner—Heidi L. Eisenhut
Attorney, Agent, or Firm—Nixon & Vanderhye P.C.

[57] ABSTRACT

A liquid crystal display device includes a substrate having formed thereon pixel electrodes, a counter substrate placed so as to face the substrate, a seal material for bonding the substrate and the counter substrate together so as to seal a liquid crystal in a spacing formed between them, and a protective circuit formed on the substrate so as to connect adjacent scanning lines and/or signal lines, wherein the protective circuit is located inside an outer edge of a bonding region on the substrate where the seal material is applied. In an alternate embodiment, the protective circuit is located inside the inner perimeter of a region where the seal material is applied. A third embodiment employs a bifurcated insulating film layer having at least two separate sections. A first section covers the protective circuit and a second section partially covers the input terminals of the signal and scanning lines. These arrangements permit a stripping-off of the insulating film layer without exposing the protective circuit to air.

20 Claims, 11 Drawing Sheets

INSULATING-FILM LAYER AND SEALANT ARRANGEMENT FOR PROTECTIVE CIRCUIT DEVICES IN A LIQUID CRYSTAL DISPLAY DEVICE

FIELD OF THE INVENTION

The present invention relates to a liquid crystal display device which displays an image by applying a driving voltage to a pixel electrode so as to align a liquid crystal based on a potential difference between the pixel electrode and a counter electrode.

BACKGROUND OF THE INVENTION

Conventionally, an active-matrix liquid crystal display device includes pixel sections independently arranged on a liquid crystal panel in a matrix form. In each pixel section, a pixel electrode and a switching element are provided.

In the active matrix liquid crystal display device, a driving voltage is applied to a pixel electrode via a switching element, and a liquid crystal is aligned based on a potential difference between the pixel electrode and a counter electrode provided facing the pixel electrode via the liquid crystal, so as to control ON/OFF of light transmitting therethrough, thereby displaying an image on the liquid crystal panel.

In the described liquid crystal display device, as a switching element, an MIM (Metal Insulator Metal) element or a TFT (Thin Film Transistor) element is used. Especially, a liquid crystal panel adopting TFT elements has the greatest demand in a variety of fields as an active matrix liquid crystal display device in view of quality and cost.

The liquid crystal display device adopting TFT elements includes scanning lines for inputting a signal for driving the TFT elements to pixel electrodes respectively formed in pixel sections arranged in a matrix form, and signal lines, formed so as to cross the scanning lines at right angle, for inputting a signal of an image to be displayed on the liquid crystal panel. The pixel electrodes are provided on the scanning lines and the signal lines via an insulating film.

The described liquid crystal display device having the arrangement wherein the pixel electrodes are provided on the scanning lines and the signal lines via the insulating film is disclosed in, for example, Japanese Unexamined Patent Publication No. 172685/1983 (Tokukaisho 58-172685). The arrangement for a liquid crystal display device as described in the above publication has the beneficial effect of improving the aperture ratio of each pixel and/or suppressing a misalignment of pixel electrodes by shielding an electric field generated from the signal lines by means of the insulating film.

Another liquid crystal display device is disclosed in Japanese Unexamined Patent Publication No. 242433/1994 (Tokukaihei 6-242433), wherein a black matrix pattern or a color filter layer are integrally formed on a substrate. This eliminates a need for considering whether an inferior alignment has occurred during the bonding of the substrate and the counter substrate together, thereby achieving a still further improved aperture ratio.

However, for the above-described case of providing the pixel electrodes on the scanning lines and the signal lines via the insulating film, the application of a source signal may cause the electrical charges on a charged electrode to move about due to an electrostatic capacitance created between the pixel electrodes and these lines (scanning lines and signal lines). This creates a phenomenon, known as longitudinal crosstalk, which becomes is most noticeable when displaying a black window pattern on a screen of an intermediate tone. In order to prevent this longitudinal crosstalk problem, it is necessary to adopt an insulating film material of electrical capacitance extremely small electric capacity for, i.e., a material of an extremely low dielectric constant. For this reason, an organic polymer thin film such as acrylic resin is used as the insulating film.

In addition, since switching elements such as TFT elements are likely to be adversely affected by electrical charges which generate a strong electric field, the static electricity generated during the manufacturing process of a liquid crystal display device may cause damage to the TFT elements. For example, in order to determine an alignment direction of liquid crystal material in a liquid crystal display (LCD) device), an alignment film made of polyimide, etc., is formed on the substrate. Then, the liquid crystal material in the vicinity of the substrate is aligned in one direction by rubbing the alignment film with a cloth, etc. In this manner, the static electricity produced by the rubbing generates an electric field which aligns the liquid crystal material. Consequently, when the scanning lines or the signal lines on the substrate are charged by the static electricity during this process, the crystalline structure of the the semiconductor layer in the TFT element is adversely affected. As a result, the threshold value of the gate voltage in the TFT element deviates. This hinders proper switching of the switching element, thereby causing defective operation of a pixel which is charged by the static electricity.

In order to prevent the above described problems, during the manufacturing process of the substrate, in general, all the input terminals of the scanning lines and the signal lines are short-circuited by a metal pattern, called a "short-ring". However, this short-ring is removed after the liquid crystal panel has been manufactured by bonding the substrate and the counter substrate together, and when mounting peripheral circuits to the input terminals by, for example, the TAB (Tape Automated Bonding) method. Therefore, the short-ring of the input terminals does not prevent the static electricity generated during the mounting process.

Thus, in order to prevent the described problem, an attempt is made to provide a protective circuit in the vicinity of the input terminals of the scanning lines and/or adjoining signal lines so as to connect the adjoining scanning lines and/or signal lines.

In general, as shown in FIG. 10, a liquid crystal panel is prepared by bonding an active matrix substrate 101 and a counter substrate 102 together by means of a seal material 103. On the active matrix substrate 101, scanning lines 106 and signal lines 107 are provided so as to cross each other at right angle. Each segment surrounded by the adjoining scanning lines 106 and the adjoining signal lines 107 serves as a pixel section 113. On both end portions of the scanning lines 106 and the signal lines 107 formed on the active matrix substrate 101, scanning line input terminals 108 and signal line input terminals 109 are formed respectively. Furthermore, on the scanning lines 106 and the signal lines 107, an interlayer insulating film 104 is formed. On the interlayer insulating film 104, the seal material 103 is applied so as not to overlap an effective display region 105. Counter electrode terminals 110 are formed parallel to the signal line input terminals 109. Each counter electrode terminal 110 is connected to a counter electrode (not shown) on the counter substrate 102 via a conductive material 111. A protective circuit 112 is provided so as to connect the adjoining scanning lines 106 and/or the adjoining signal lines 107.

As shown in FIG. 11, the protective circuit 112 can be formed using switching elements of a diode structure. The switching element is prepared by placing a gate electrode 115, a gate insulating film 116 and a semiconductor thin film 117 on the active matrix substrate 101 in this order.

In the source section of the semiconductor thin film 117, a source electrode 118a made of n+-silicon layer is formed, and in the drain section, a drain electrode 118b made of n+-silicon layer is formed. To the source electrode 118a, a metal layer 119a which serves as a source wiring is connected, and to the drain electrode 118b, a metal layer 119b which serves as a drain wiring is connected. Further, the interlayer insulating film 104 is formed so as to cover the switching elements entirely.

The protective circuit 112 may be formed, for example, as a diode ring structure wherein the described switching elements are connected in parallel and opposite directions may be adopted. The protective circuit 112 is provided so as to connect adjoining scanning electrodes 106 and/or adjoining signal electrodes 107. According to the described arrangement, even if an electric field of not less than a predetermined intensity is applied to one line 106 or 107, the charge can be released to the adjoining scanning lines 106 and/or the adjoining signal lines 107, thereby preventing an occurrence of an inferior liquid crystal display device as previously described.

However, in the process of connecting peripheral circuits to the input terminals of the liquid crystal panel, if foreign substances enter a bonded part by the TAB method, or the peripheral circuits are bonded to the input terminals in a displaced position, it is required to strip the part already bonded and mount the peripheral circuit again by the TAB method.

In order to strip the part already bonded from the input terminals, it is required to apply a large force. However, the insulating film made of an organic polymer thin film does not have a sufficient adhesiveness to the substrate or the gate insulating film, etc., unlike the metal thin film or the silicon thin film, etc. Therefore, depending on the strength of the force applied when removing the part already bonded from the input terminals, the insulating film under the bonded part may be stripped as well.

As the described protective circuit is provided in a vicinity of the input terminals of the scanning lines or the signal lines, the insulating film which covers the protective circuit may be stripped. If the insulating film which covers the protective circuit is stripped, as the protective circuit is exposed to the outside air, the semiconducting characteristics of the protective circuit deteriorate, and its performances suffer.

Furthermore, a distance between the source section and the drain section of the protective circuit is much smaller than the distance between the input terminals. Therefore, in the case where the protective circuit is exposed to the outside air, electrically conductive substances and humidity may adhere to the protective circuit, which causes a defect such as a leakage between terminals of the protective circuit. Such defect of the protective circuit adversely affects the display image of the liquid crystal display device.

SUMMARY OF THE INVENTION

It is an object of the present invention to provide a liquid crystal display device which prevents the occurrence of the interior of a protective circuit being exposed to outside air subsequent to a stripping of an insulating film which covers the protective circuit.

In order to achieve the above object, a liquid crystal display device in accordance with the present invention includes:

a substrate having formed thereon pixel electrodes;

a counter substrate placed so as to face the substrate;

a seal material for bonding the substrate and the counter substrate together so as to seal a liquid crystal in a spacing formed between them; and a protective circuit formed on the substrate so as to connect adjoining scanning lines and/or signal lines, wherein the protective circuit is provided inside an outer end i.e., edge of a bonding region on the substrate, where the seal material is applied.

According to the described arrangement of the liquid crystal display device, for example, when removing the peripheral circuit already mounted to the substrate, even if the insulating film is stripped undesirably, since the protective circuit is provided inside the outer edge of the region where the seal material is applied, the insulating film which covers the protective circuit is not stripped. Therefore, inferior performance, induced as a result of the protective circuit being exposed to outside air, can be prevented. Additionally, as only the region where the protective circuit is provided differs from the conventional liquid crystal display device, the number of manufacturing processes does not increase. Therefore, an increase in the steps of the manufacturing process as well as an increase in the manufacturing cost can be avoided.

The liquid crystal display device of the present invention may be arranged so as to include a substrate having formed thereon pixel electrodes;

a protective circuit so as to connect adjoining scanning lines and/or signal lines arranged on the substrate, a first insulating film which covers the protective circuit, and a second insulating film formed outside the first insulating film, wherein the first insulating film and the second insulating film are formed discontinuously.

According to the described arrangement of the liquid crystal display device, as the insulating films are formed discontinuously, even if the second insulating film is stripped, the first insulating film which covers the protective circuit is not stripped. As a result, inferior performance of the LCD device, induced as a result of the protective circuit is exposed to outside air can be prevented.

The novel features which are considered as characteristic of the invention are set forth in particular in the appended claims. The improved treatment method, as well as the construction and mode of operation of the improved LCD apparatus, will, however, be best understood upon perusal of the following detailed description of certain specific embodiments when read in conjunction with the accompanying drawings.

DESCRIPTION OF THE EMBODIMENTS

The following descriptions will explain one embodiment of the present invention in reference to FIG. 1 through FIG. 6.

First, a liquid crystal panel as an active matrix liquid crystal display in accordance with the present invention will be explained.

Figure 1:
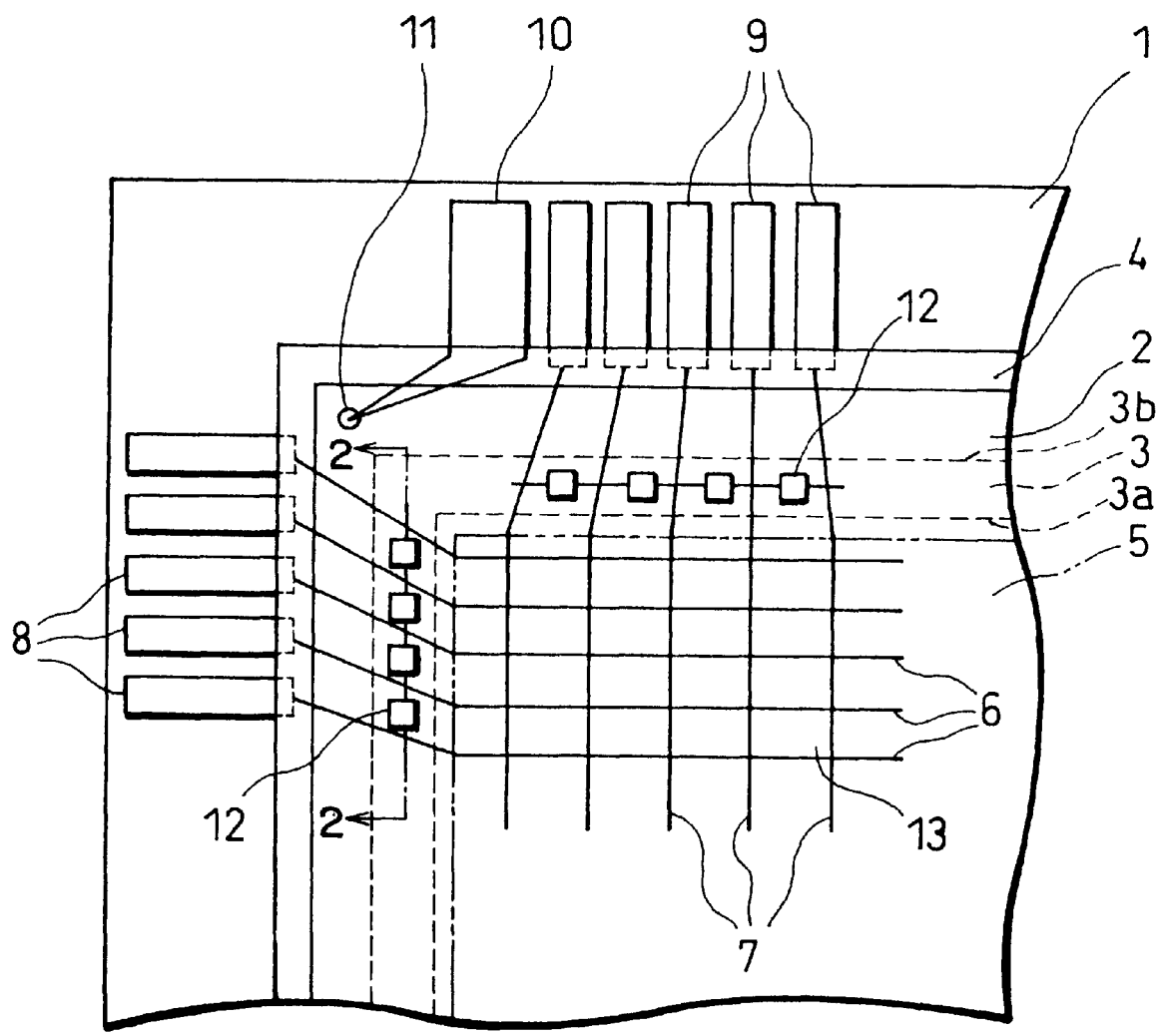
FIG. 1 is a plan view which shows essential parts of a liquid crystal panel in accordance with one embodiment of the present invention.

As shown in FIG. 1, the liquid crystal panel includes an active matrix substrate (substrate) 1 made of a transparent insulating material such as glass, etc., and a counter substrate 2. The active matrix substrate 1 and the counter substrate 2 are bonded together by means of a seal material 3. On the active matrix substrate 1, scanning lines 6 and signal lines 7 are arranged so as to cross each other at right angle. Each segment surrounded by adjoining scanning lines 6 and signal lines 7 serves as a pixel section 13. At both ends of the scanning lines 6 and the signal lines 7 formed on the active matrix substrate 1, scanning line input terminals 8 and signal line input terminals 9 are formed respectively. Furthermore, on the scanning lines 6 and the signal lines 7, an interlayer insulating film (insulating film) 4 is formed. Further, the seal material 3 is formed so as not to overlap an effective display region 5 of the liquid crystal panel.

Counter electrode terminals 10 are formed parallel to the signal line input terminals 9. The counter electrode terminals 10 are connected to counter electrodes (not shown) on the counter substrate 2 via a conductive material 11. The protective circuit 12 is formed so as to connect adjoining scanning lines 6 and/or adjoining signal lines 7.

Figure 2:
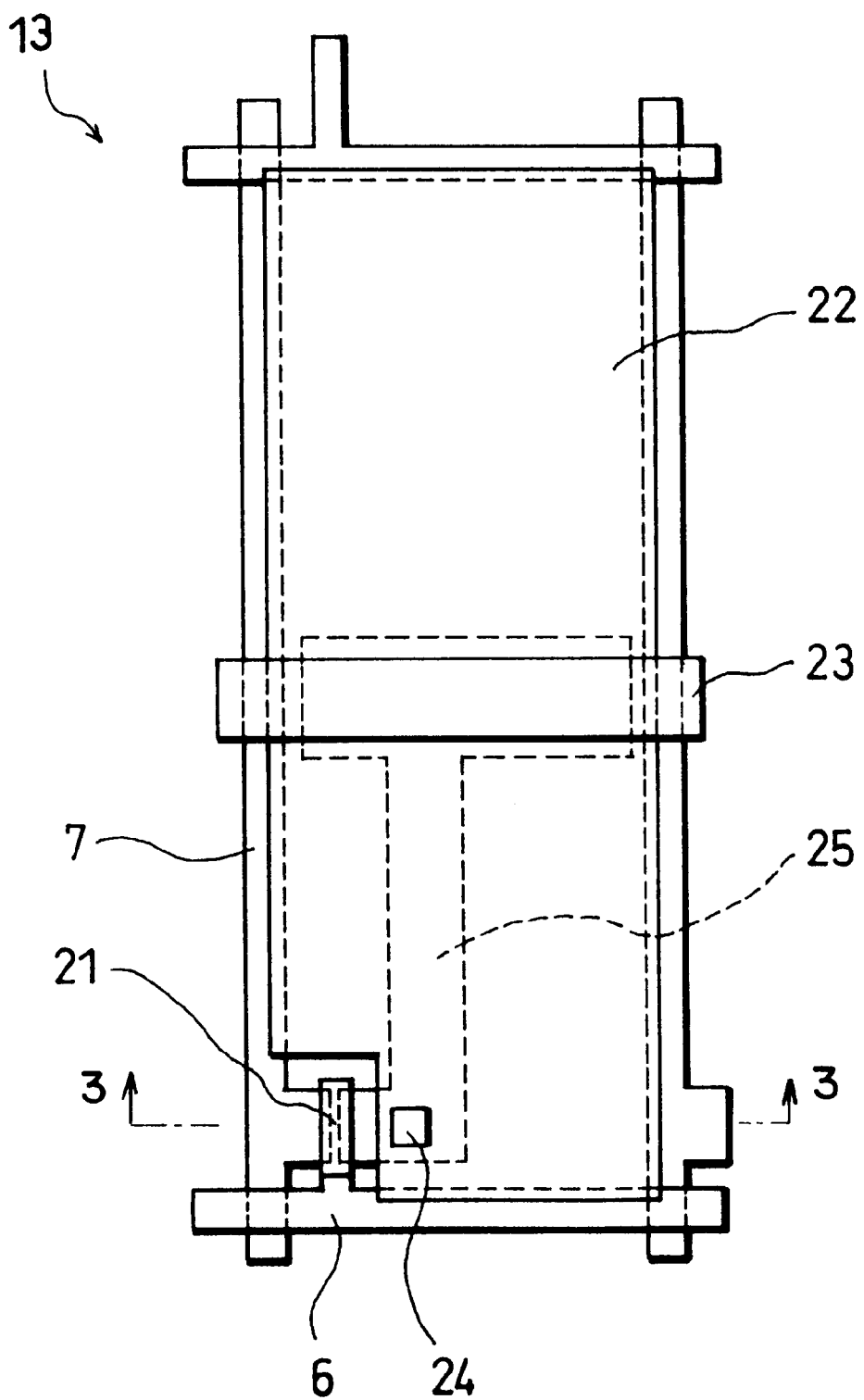
FIG. 2 is a plan view showing a pixel section in the liquid crystal panel of FIG. 1.

As shown in FIG. 2, in the liquid crystal panel, in each pixel section 13 surrounded by the adjoining scanning lines 6 and the adjoining signal lines 7, provided are a TFT element 21, a pixel electrode 22, a storage capacity (not shown) of the pixel section, a storage capacity wiring 23, a contact hall 24 and an ITO (Indium Tin Oxide) transparent conductive film 25.

The scanning line 6 is connected to the gate electrode of the TFT element 21. The signal line 7 is connected to the source electrode of the TFT element 21. To the drain electrode of the TFT element 21, the pixel electrode 22 and one of the terminals of the storage capacity of the pixel section are connected via the ITO transparent conductive film 25. The other terminal of the storage capacity is connected to the storage capacity wiring 23. The storage capacity wiring 23 is connected to the counter electrode placed so as to face the pixel electrode 22. The pixel electrode 22 is connected to the ITO transparent conductive film 25 through the contact hall 24 formed so as to pierce the interlayer insulating film 4.

Figure 3:
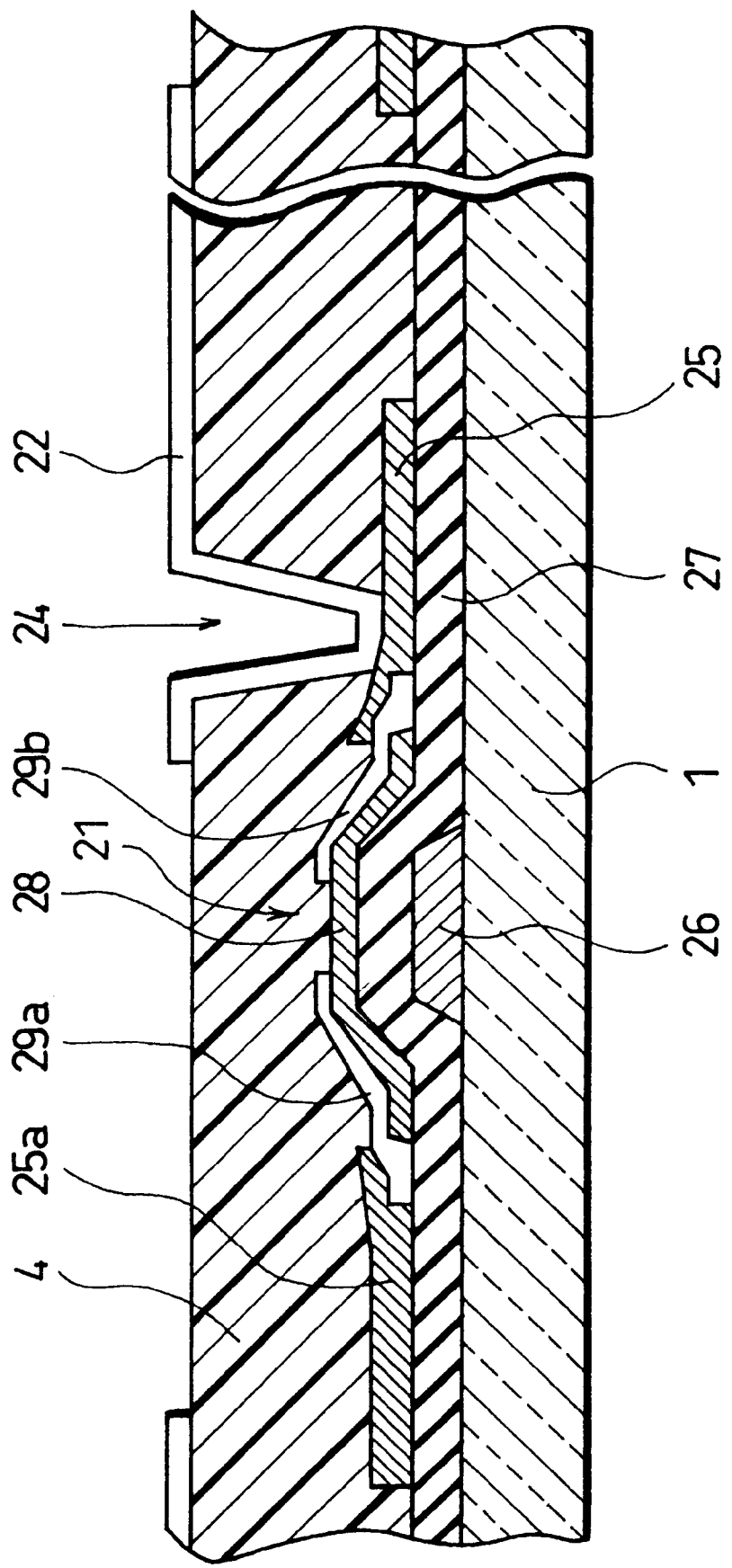
FIG. 3 is a cross-sectional view of the pixel section of FIG. 2 taken along a line B–B'.

As shown in FIG. 3, the TFT element 21 is arranged so as to include a gate electrode 26 formed on the active matrix substrate 1, and the gate insulating film 27 formed so as to cover the gate electrode 26. On the gate electrode 26, a semiconductor thin film 28 is formed via the gate insulating film 27. On the source section of the semiconductor thin film 28, a source electrode 29a made of an $n^+$-silicon layer is formed, and on the drain section, a drain electrode 29b made of an $n^+$-silicon layer is formed.

To the source electrode 29a, a metal layer 25a which serves as a source wiring is connected, and to the drain electrode 29b, the ITO transparent conductive film 25 which serves as a drain wiring is connected. The surface of the TFT element 21 is covered with the interlayer insulating film 4. Furthermore, the pixel electrode 22 is formed on the interlayer insulating film 4. The pixel electrode 22 is connected to the ITO transparent conductive film 25 which serves as a drain wiring of the TFT element 21 via the contact hall 24.

Figure 4:
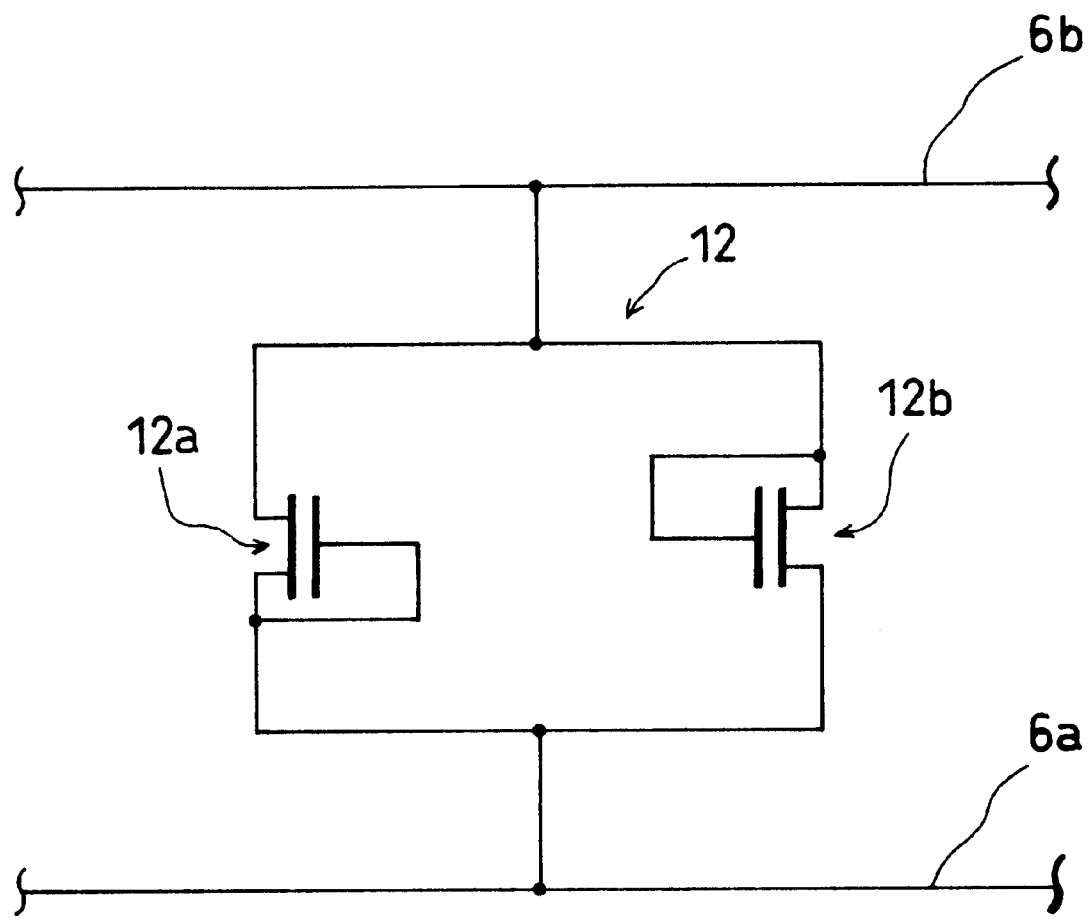
FIG. 4 is a circuit diagram of a protective circuit adopted in the liquid crystal panel.

As shown in FIG. 4, the protective circuit 12 has a diode ring structure wherein two switching elements 12a and 12b of a diode structure are connected in parallel and opposite directions.

For example, as shown in FIG. 4, explanations will be given through the two adjoining scanning lines 6a and 6b. The switching element 12a is arranged such that the source section and the gate section are short-circuited, and both the source and gate sections are electrically connected to the drain section of the switching element 12b and the scanning line 6a. The drain section of the switching element 12a is electrically connected to the scanning line 6b, and to the source section and the gate section of the switching element 12b.

On the other hand, the switching element 12b is arranged such that the source section and the gate section are short-circuited, and both the source and gate sections are electrically connected to the drain section of the switching element 12a and the scanning line 6b. The drain section of the switching element 12b is electrically connected to the scanning line 6a, and to the source section and the gate section of the switching element 12a.

Figure 5:
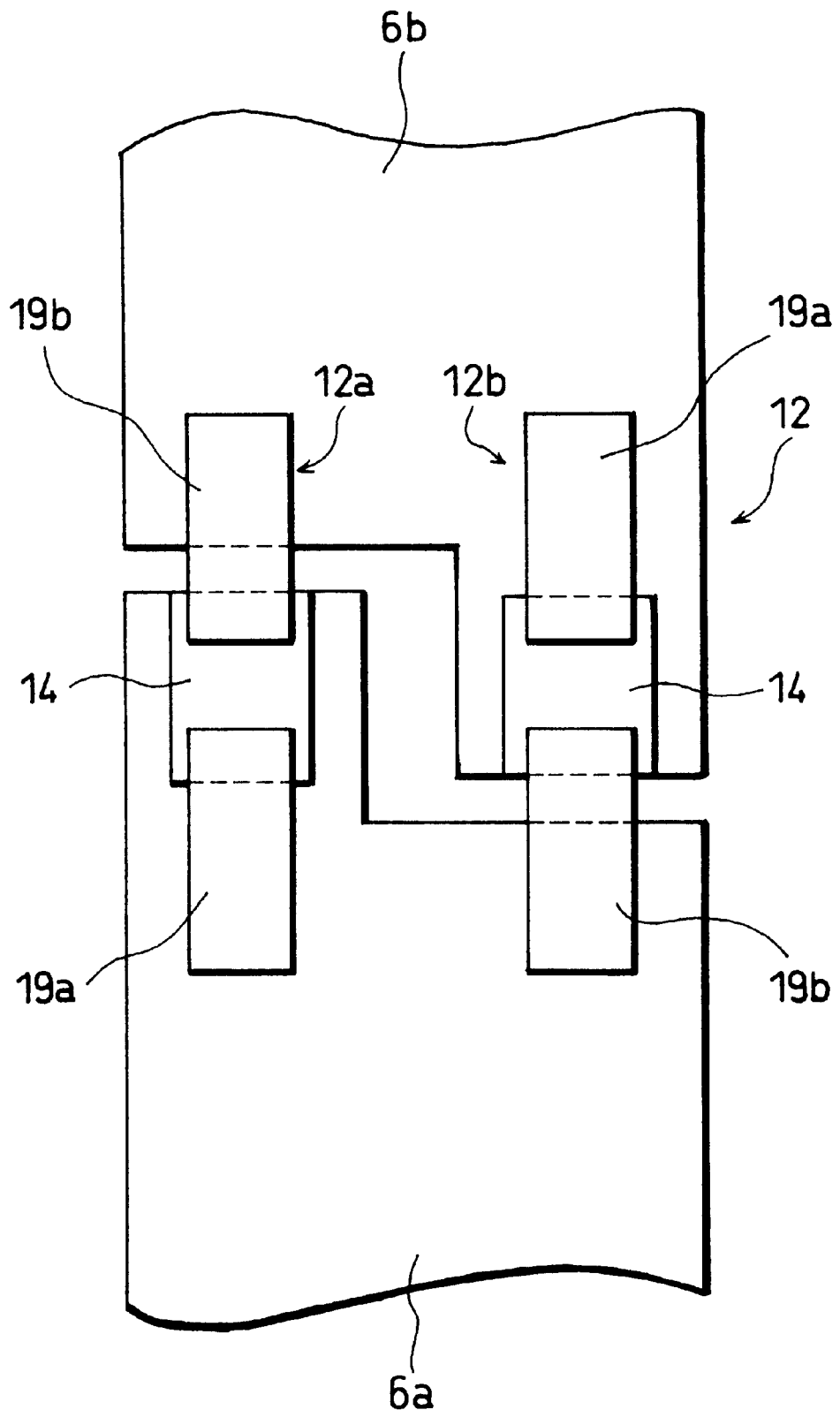
FIG. 5 is a plan view of the protective circuit of FIG. 4.

As shown in FIG. 5, the switching element 12a includes a diode 14 formed on the scanning line 6a on the active matrix substrate 1. To the source section of the diode 14, a metal layer 19a which serves as a source wiring is connected, and to the drain section of the diode 14, a metal layer 19b which serves as the drain wiring is connected. Furthermore, the metal wiring 19b is connected to the scanning line 6b adjacent to the scanning line 6a.

On the other hand, the switching element 12b includes the diode 14 formed on the scanning line 6b. To the source section of the diode 14, a metal layer 19a which serves as a source wiring is connected, and to the drain section, a metal layer 19b which serves as a drain wiring is connected. Furthermore, the metal layer 19b is connected to the scanning line 6a adjacent to the scanning line 6b.

Figure 6:
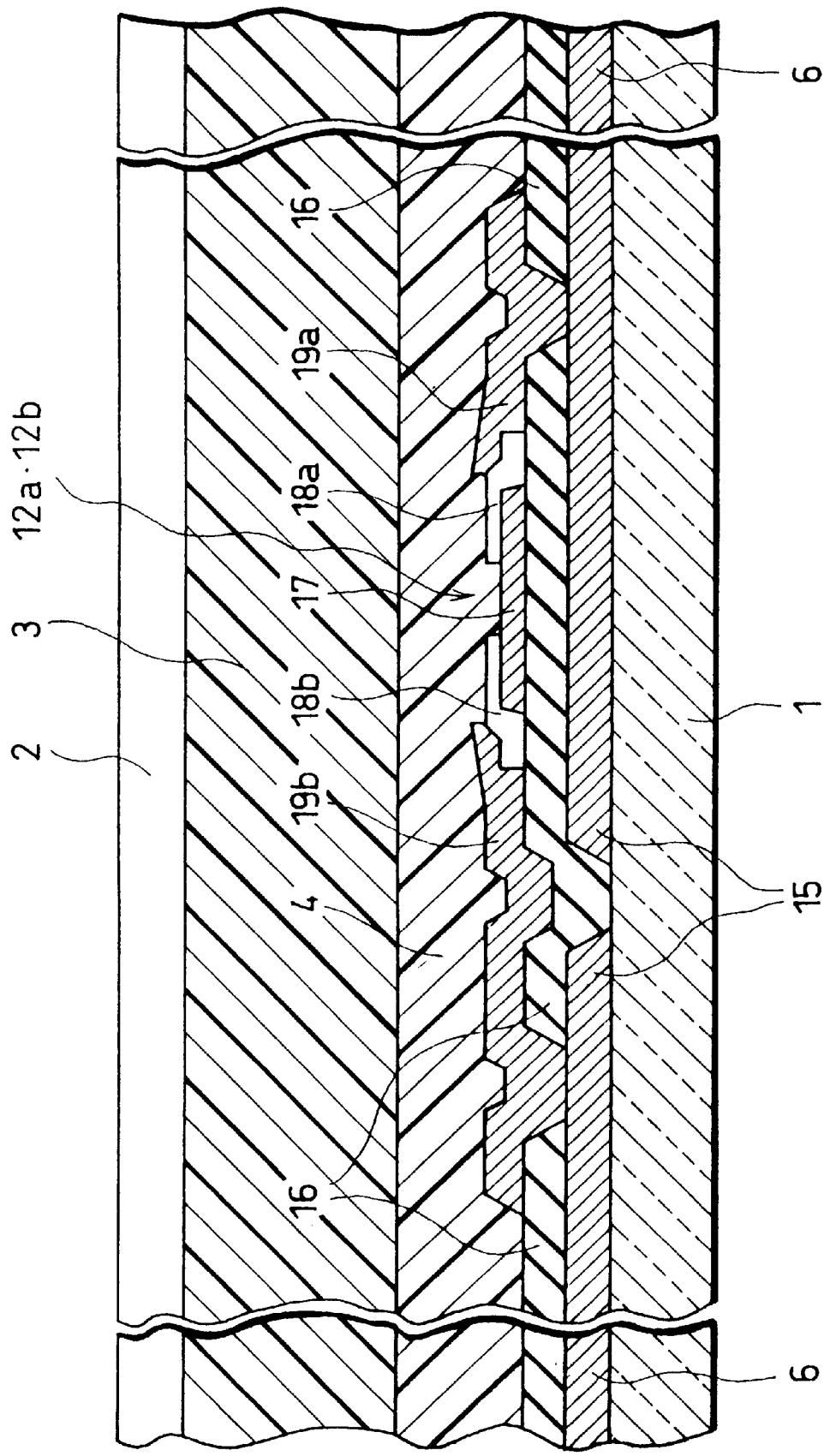
FIG. 6 is a cross-sectional view of the liquid crystal panel of FIG. 1 taken along a line A–A'.

As shown in FIG. 6, the switching element 12a (12b) is arranged such that the gate electrode 15 is formed on the active matrix substrate 1 as shown in FIG. 6, and the gate insulating film 16 is formed so as to cover the gate electrode 15. On the gate electrode 15, the semiconductor thin film 17 is formed via the gate insulating film 16. In the source section of the semiconductor thin film 17, a source electrode 18a made of an $n^+$-silicon layer, and in the drain section, a drain electrode 18b made of an $n^+$-silicon layer is formed.

To the source electrode 18a, a metal layer 19a which serves as a source wiring is connected, and to the drain electrode 18b, a metal layer 19b which serves as a drain wiring is connected. Further, the interlayer insulating film 4 is formed so as to cover the switching elements 12a and 12b.

When adopting the described protective circuit 12, even if the scanning line 6a is charged by a static electricity, the charge is released to the scanning line 6b via the switching element 12a. On the other hand, when an electric charge is generated on the scanning line 6b, the charge released to the scanning line 6a via the switching element 12b.

As shown in FIG. 1, the liquid crystal panel includes the protective circuit 12 having the described arrangement so as to connect the adjoining scanning lines 6 and adjoining the signal lines 7. It should be noted here that the protective circuit 12 may be formed so as to connect only either the adjoining scanning lines 6 or the adjoining signal lines 7. Therefore, an electric charge is generated from one of the scanning lines 6 or the signal lines 7 is released to the adjoining scanning lines 6 or the signal lines 7 via the protective circuit 12. As a result, the TFT element 21 in the specific pixel section 13 can be prevented from having a strong electric field applied thereto, thereby protecting the function of the TFT element 21.

The following will explain a manufacturing method of the liquid crystal panel.

On the active matrix substrate 1, a metal layer which serves as the scanning lines 6 is formed by a sputtering method. On the resulting scanning lines 6 as a gate section, the TFT element 21 is formed. The pixel section 13 is formed by carrying out a sputtering in such a manner that the ITO transparent conductive film 25 is connected to the drain section and the source section of the TFT element 21. Furthermore, the metal layer 25a is formed by a sputtering method to be connected to the source section of the TFT element 21. Namely, the signal line 7 has a double-layered structure of the metal layer 25a and the ITO transparent conductive film 25.

The scanning line input terminals 8 are formed on both ends of the scanning lines 6, and the signal line input terminals 9 are formed on both ends of the signal lines 7. The protective circuits 12 are formed 21 so as to connect the adjoining scanning lines 6 and/or signal lines 7 in the same manner as the TFT element.

On the active matrix substrate 1 wherein the scanning lines 6 and the signal lines 7 are formed in the described manufacturing process, a photoconductive organic polymer thin film such as acrylic resin, etc., is applied by a spin coating method so as to form the interlayer insulating film 4 having a film thickness of 3 μm. Here, the acrylic resin is applied to the protective circuit 12, but is not applied entirely to the scanning line input terminals 8 and the signal line input terminals 9.

With respect to the acrylic resin, an exposure is performed according to the pattern as desired. Thereafter, an etching process is performed using an alkali etching solution. As a result, only an unexposed portion of the acrylic resin is etched, thereby forming the contact hall 24 which pierces the interlayer insulating film 4.

On the interlayer insulating film 4, a transparent conductive film which serves as the pixel electrodes 22 is formed by a patterning by the sputtering method. The pixel electrodes 22 are connected to the ITO transparent conductive film 25 via the contact hall 24.

In the manufacturing process with respect to the active matrix substrate 1 having formed thereon pixel electrodes 22, etc., as shown in FIG. 1, a polyimide alignment film is formed on the effective display area 5, and an alignment function is applied thereto, for example, by a rubbing process. Additionally, with respect to the counter electrode 2, a transparent counter electrode made of ITO is formed, and an alignment function is applied to the effective display area 5, for example, by a rubbing process.

To the active matrix substrate 1, the seal material 3 is applied in such a manner that an injection opening for injecting therethrough a liquid crystal layer is formed. Here, the seal material 3 is applied onto the protective circuit 12. On the other hand, to the counter electrode terminals 10 on the counter substrate 2, a conductive material 11 is applied so as to adhere to the counter electrode terminals 10. Thereafter, in order to maintain the thickness of the liquid crystal layer constant, a spacer, not shown, is dispersed in the effective display area 5.

Then, the active matrix substrate 1 and the counter substrate 2 are placed in parallel so as to sandwich seal material 3. Next, heat is applied to harden the seal material 3, thereby bonding the active matrix substrate 1 and the counter substrate 2 together. Finally, the liquid crystal layer is injected through the injection opening, thereby obtaining a liquid crystal panel in accordance with the present embodiment.

In order to drive the liquid crystal panel by supplying a control signal from an external section, a peripheral circuit is mounted, for example, using the TAB method to the scanning line input terminals 8 and the signal line input terminals 9. First, on the scanning line input terminals 8 and the signal line input terminals 9, an anisotropic electrically conductive film is formed. Further, the peripheral circuit which stores a driver IC, etc., is mounted in such a manner that the output terminals of the peripheral circuit match the input terminals 8 and 9. Then, the described laminated structure is bonded under applied pressure and heat using the TAB method.

The liquid crystal panel to which the peripheral circuit is mounted is arranged so as to drive the pixel electrode 22 by applying a driving voltage to the TFT elements 21 via the signal lines 7. On the other hand, a control voltage is applied to the TFT elements 21 via the scanning lines 6. A driving voltage to be applied to the liquid crystal layer from the pixel electrode 22 is controlled by a control voltage to adjust a transmissivity of the liquid crystal layer. As a result, an image is displayed on the liquid crystal panel.

The signal line 7 has a double layered structure of the metal layer 25a and the ITO transparent conductive film 25. Therefore, even in the case where a defect occurs in a part of the metal layer 25a which constitutes the signal line 7, as an electric connection is maintained by the ITO transparent conductive film 25, an occurrence of a disconnection inferior of the signal line 7 can be reduced.

An inspection of the liquid crystal panel having mounted thereon the peripheral circuit is carried out by flashing it. When mounting the peripheral circuit, foreign substances may enter the bonded part of the peripheral circuit, or the output terminals of the peripheral circuit and the input terminals 8 and 9 of the liquid crystal panel may be bonded in a displaced position. When such an inferior mounting causes an abnormality of the scanning line 6 or the signal line 7, a new peripheral circuit is mounted after removing the existing peripheral circuit.

According to the described arrangement, even if the interlayer insulating film 4 is stripped when removing the peripheral circuit which is already mounted, as shown in FIG. 1 and FIG. 6, as the protective circuit 12 is covered with the seal material 3, the interlayer insulating film 4 which covers the protective circuit 12 is not stripped. Therefore, as the protective circuit 12 is not exposed to the outside air, and the occurrence of a malfunction such as leakage currents between the scanning line input terminals 8 and the signal line input terminals 9 can be prevented.

Figure 7:
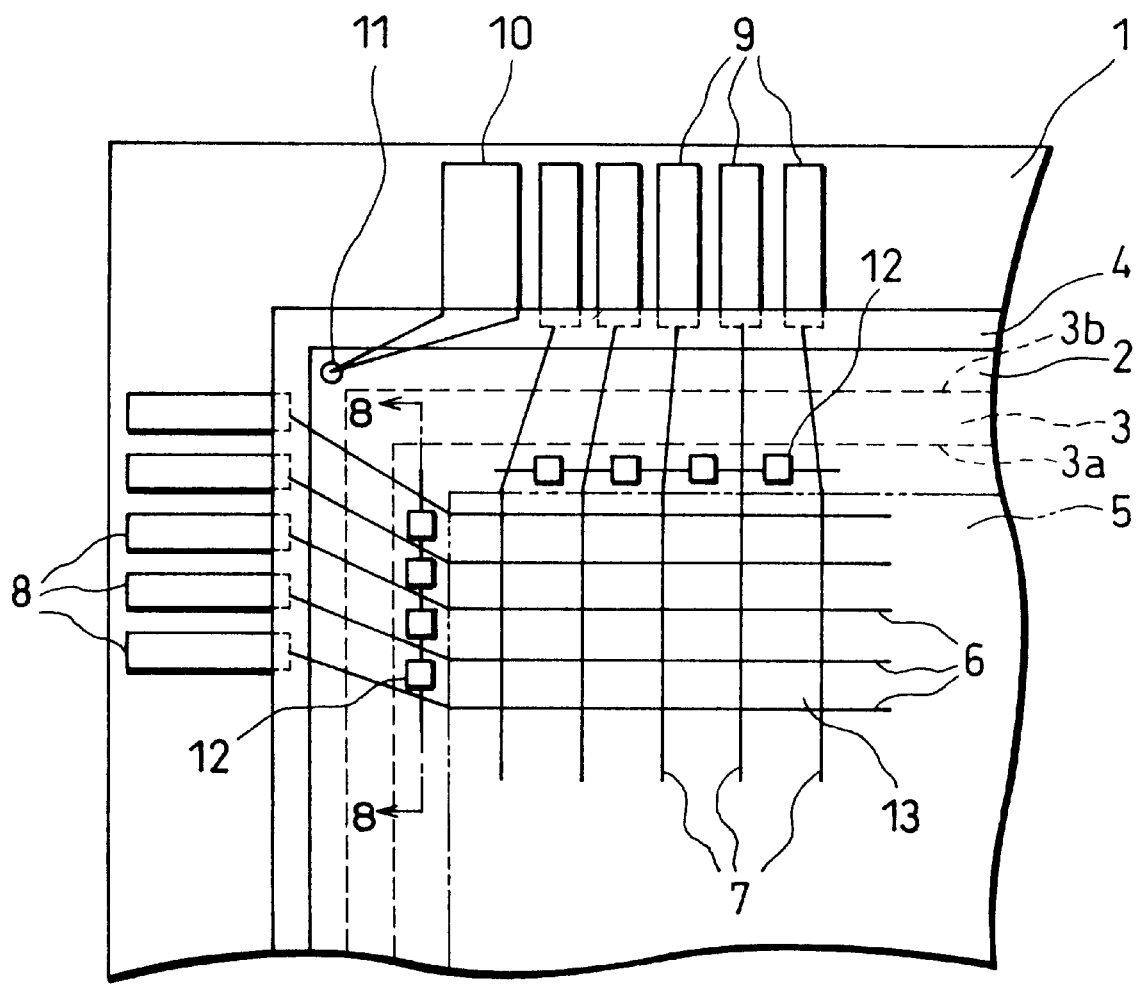
FIG. 7 is a plan view of essential parts of the liquid crystal panel in accordance with another embodiment of the present invention.
Figure 8:
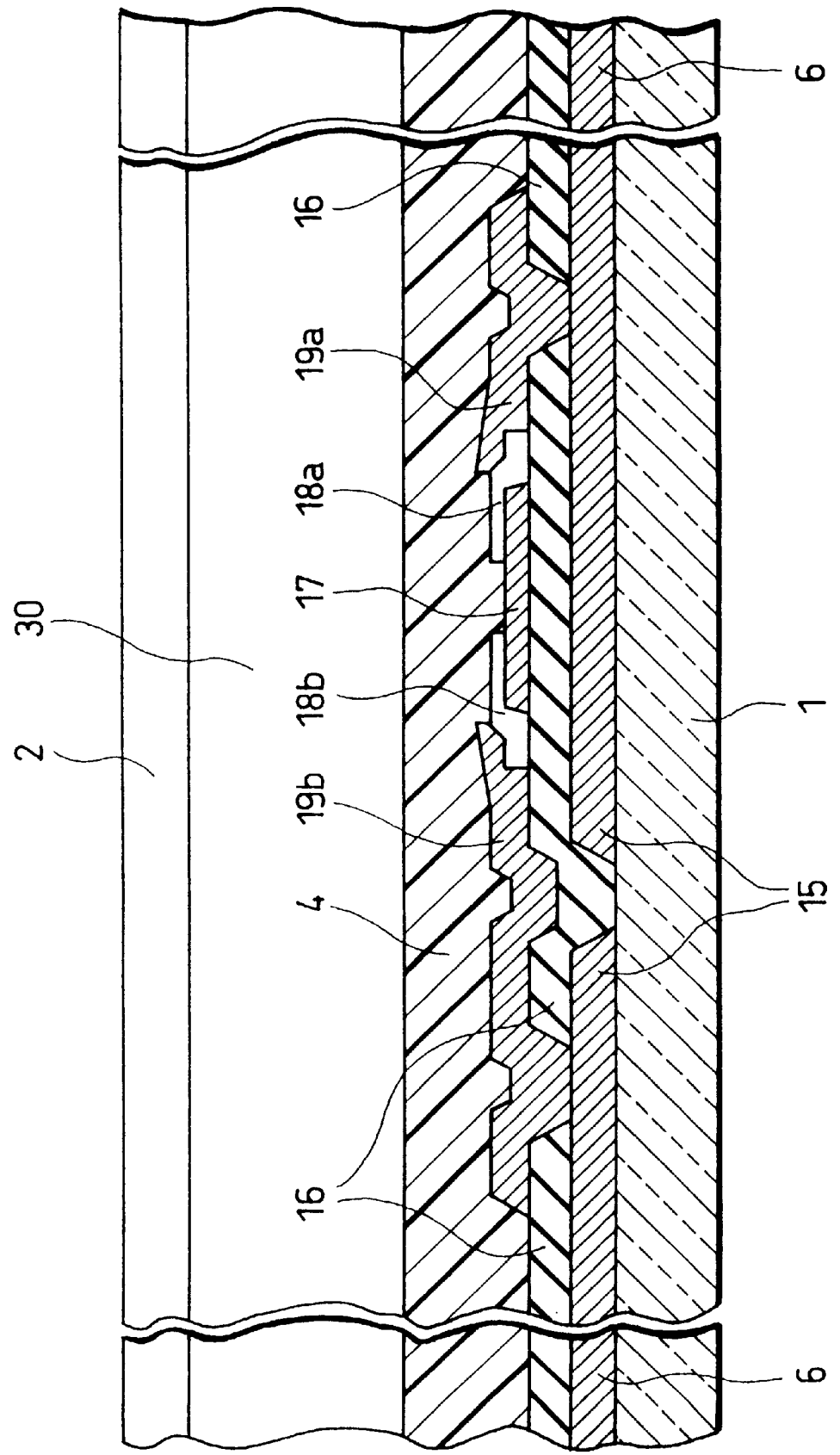
FIG. 8 is a perspective cross-sectional view of the liquid crystal panel of FIG. 7 taken along a line C–C'.

The following descriptions will explain another embodiment of the present invention in reference to FIG. 7 and FIG. 8. Here, members having the same function as those of the aforementioned embodiment will be designated by the same reference numerals, and thus the descriptions thereof shall be omitted here.

As shown in FIG. 7 and FIG. 8, the liquid crystal panel in accordance with the present embodiment includes a protective circuit 12 formed inside an inner end 3a of a region where the seal material 3 is applied. Other than the above, the liquid crystal panel in accordance with the present embodiment has the same structure as that of the liquid crystal panel of the first embodiment.

A detection of the liquid crystal panel having mounted thereon the peripheral circuit is carried out by flashing it. When mounting the peripheral circuit, foreign substances may enter the bonded portion of the peripheral circuit, or the output terminals of the peripheral circuit and the input terminals 8 and 9 of the liquid crystal panel may be bonded in a displaced position. When such inferior causes an abnormality in the scanning line 6 or the signal line 7, a new peripheral circuit is mounted after once removing the existing peripheral circuit already.

According to the described arrangement, even if the interlayer insulating film 4 is stripped when removing the peripheral circuit, as shown in FIG. 7, the part being stripped would stop at the part covered with the seal material 3. Therefore, the part of the interlayer insulating film 4 which covers the protective circuit 12 is not stripped. Therefore, as the protective circuit 12 is not exposed to the outside air, the occurrence of a malfunction such as a leakage current between the scanning line input terminals 8 or the signal line input terminals 9 can be prevented.

Moreover, a malfunction might occur in the manufacturing process of the protective circuit 12 which for some reason adversely affects a display state of the liquid crystal panel. However, as shown in FIG. 8, the liquid crystal panel in accordance with the present embodiment does not have the seal material 3 on the protective circuit 12. Therefore, a laser beam can be projected onto the defective protective circuit 12, thereby permitting the defective protective circuit 12 to be separated from the scanning lines 6 or the signal lines 7.

Namely, as a liquid crystal layer 30 is formed above the protective circuit 12, when projecting the laser beam, a space in which pieces of the protective circuit 12 are dispersed is ensured. Therefore, the defective protective circuit 12 can be melted/cut by a projection of the laser beam to be separated from the scanning lines 6 or the signal lines 7. As a result, adverse effects on the display image on the liquid crystal panel due to inferior function of the protective circuit 12 can be avoided, thereby ensuring a proper display state of the liquid crystal panel.

Figure 9:
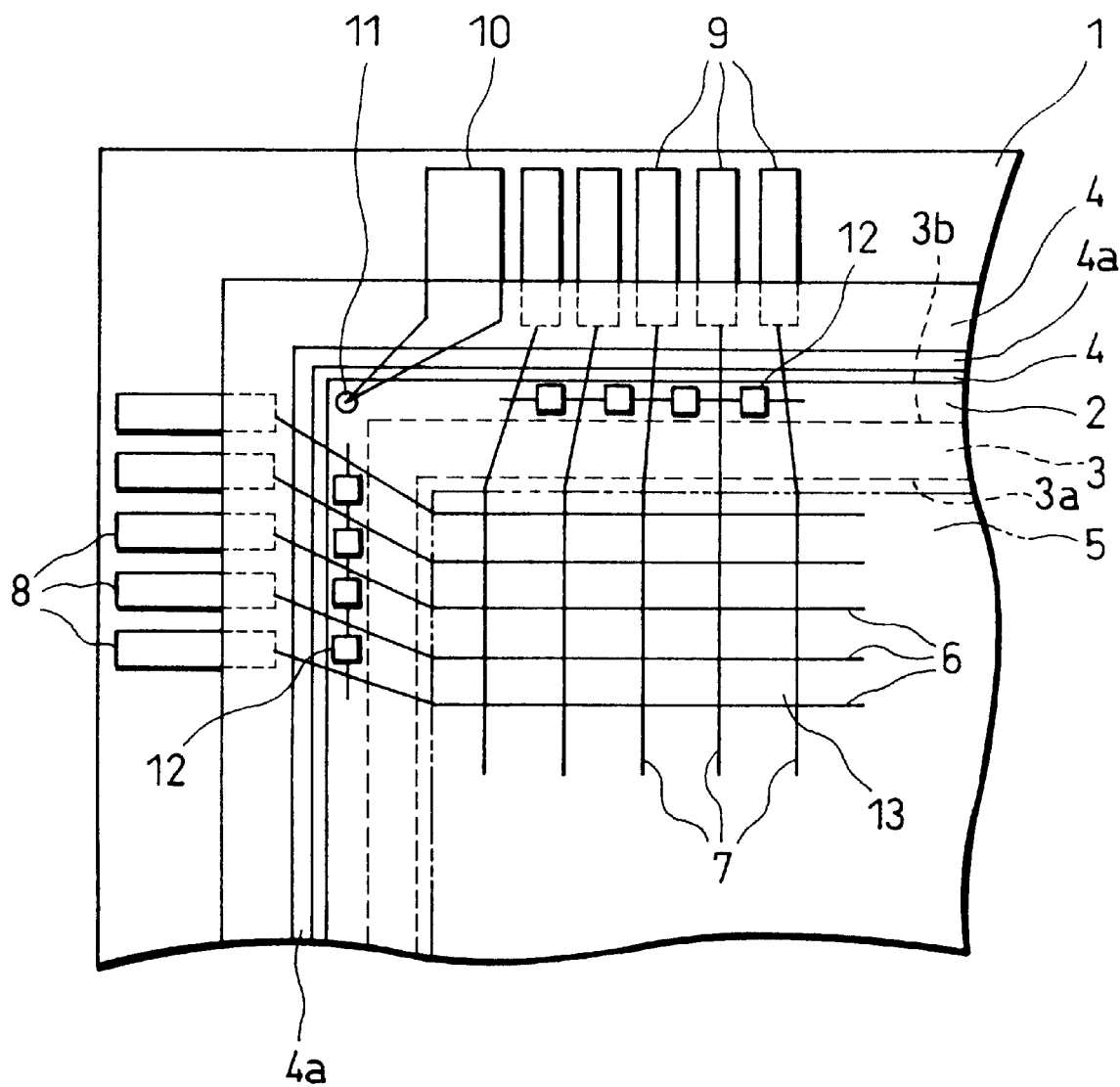
FIG. 9 is a plan view showing essential parts of a liquid crystal panel in accordance with still another embodiment of the present invention.
Figure 10:
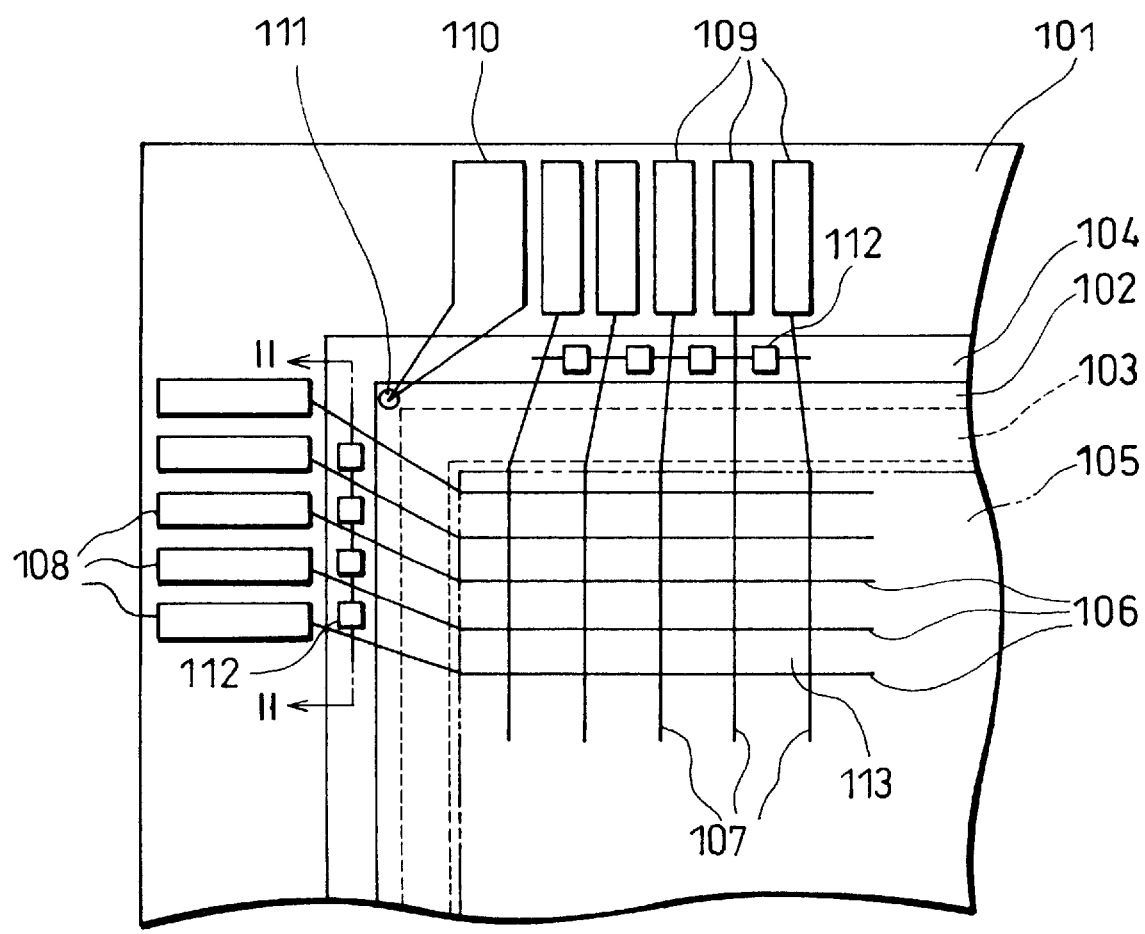
FIG. 10 is a plan view showing essential parts of a conventional active matrix liquid crystal panel.
Figure 11:
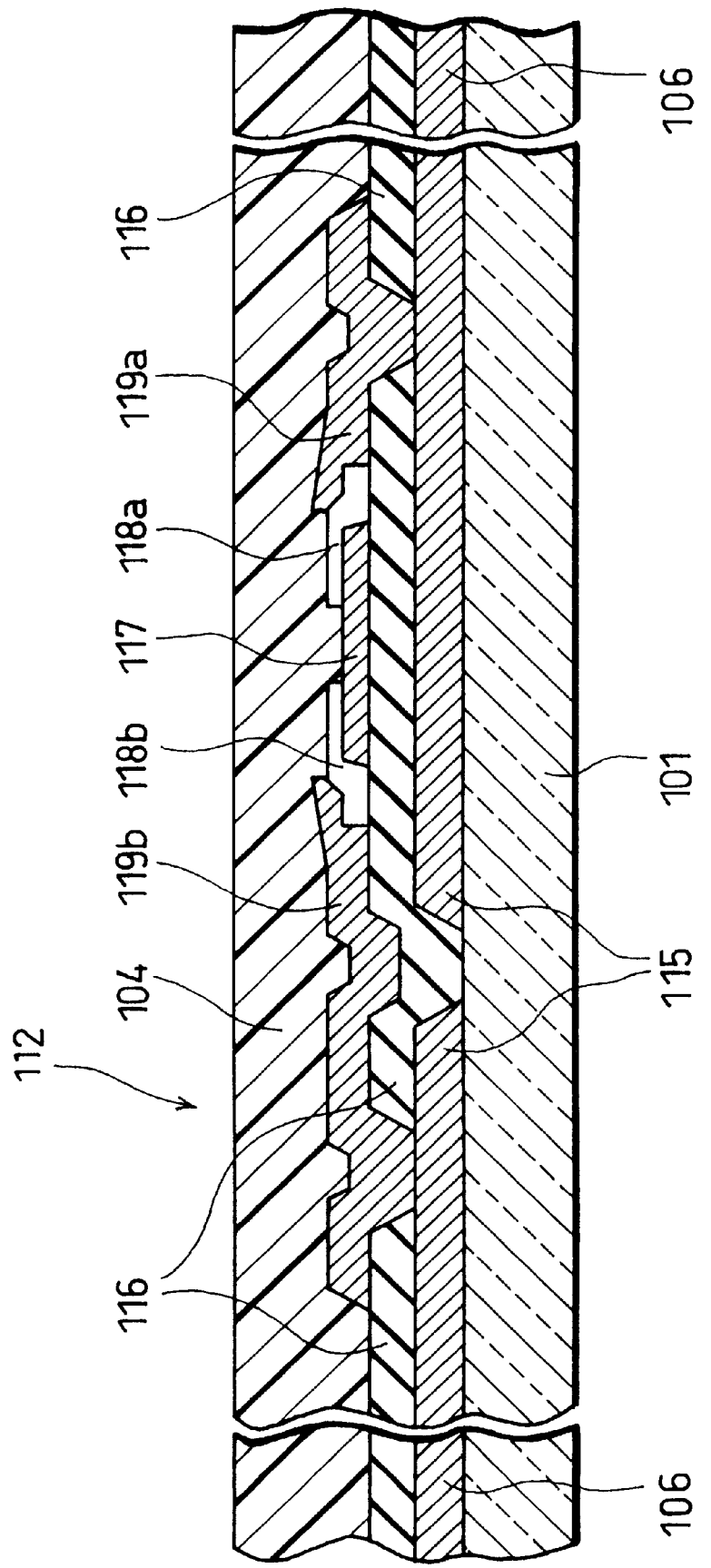
FIG. 11 is a cross-sectional view of the liquid crystal panel of FIG. 10 taken along a line D–D'.

The following descriptions will explain still further embodiments of the present invention in reference to FIG. 9. Elements having the same function as those of the aforementioned embodiment will be designated by the same reference numerals, and thus the descriptions thereof shall be omitted here.

The liquid crystal panel in accordance with the present embodiment includes a first interlayer insulating film 4 which covers the protective circuit 12 and a second interlayer insulating film 4 which partially covers the scanning line input terminals 8 and the signal line input terminals 9. The described interlayer insulating films 4 are formed discontinuously. Other than the above, the liquid crystal panel in accordance with the present embodiment has the same structure as the liquid crystal panel of the first embodiment.

As shown in FIG. 9, the protective circuit 12 may be formed outside the outer end 3b of the region where the seal material 3 is applied. However, like the first embodiment, the arrangement wherein the protective circuit 12 is covered with the seal material 3 like the first embodiment, and the arrangement wherein the protective circuit 12 is provided inside the inner end 3a of the region where the seal material 3 is applied like the second embodiment may be adopted. Namely, the required condition of the present embodiment is that the discontinuous region 4a of the interlayer insulating films 4 is located outside the region where the protective circuit 12 is provided.

An inspection of the liquid crystal panel having the peripheral circuit mounted thereon is carried out by flashing it. When mounting the peripheral circuit, foreign substances may enter the bonded portion of the peripheral circuit, or the output terminals of the peripheral circuit and the input terminals 8 and 9 of the liquid crystal panel may be bonded in a displaced position. When such an inferior mounting results in an abnormality in the scanning line 6 or the signal line 7, a new peripheral circuit is mounted after removal of the existing peripheral circuit.

According to the described arrangement, even if the interlayer insulating film 4 is stripped when removing the peripheral circuit, the part being stripped would stop at disconnected part 4a of the interlayer insulating films 4. Therefore, as the protective circuit 12 is not exposed to the outside air, the occurrence of undesirable side effects such as leakage currents between the scanning line input terminals 8 or between the signal line input terminals 9 can be prevented.

Furthermore, for example, as shown in FIG. 9, if the seal material 3 is not applied onto the protective circuit 12, the defective protective circuit 12 can be melted and cut to be separated from the scanning lines 6 and the signal lines 7 by a projection of the laser beam. As a result, an adverse effect on the display image on the liquid crystal panel due to inferior performances of the protective circuit 12 can be avoided, thereby restoring a normal display state of the liquid crystal panel.

As described, the first embodiment of a liquid crystal display device in accordance with the present invention includes a protective circuit formed on the substrate so as to connect adjoining scanning lines and/or signal lines, and pixel electrodes formed on the substrate via an insulating film, wherein the substrate and the counter substrate are bonded together via a seal material for sealing a liquid crystal in a space formed between the substrate and the counter substrate, wherein the protective circuit is formed in a region on the substrate where the seal material is applied.

According to the above described arrangement of the first liquid crystal display device embodiment, for example, when removing the peripheral circuit mounted to the substrate, even if a portion of the insulating film is stripped off, since the protective circuit is covered with the seal material, the portion of the insulating film which covers the protective circuit is not stripped. Therefore, a malfunction induced, for example, as the result of the protective circuit being exposed to outside air can be prevented. Additionally, as only the region where the protective circuit is provided differs from the conventional liquid crystal display device, the number of manufacturing processes does not increase. Therefore, an increase in the steps of the manufacturing process as well as an increase in the manufacturing cost can be avoided.

The second embodiment of a liquid crystal display device of the present invention includes a protective circuit formed on a substrate so as to connect adjoining scanning lines and/or signal lines, pixel electrodes provided on the substrate via an insulating film, wherein the substrate and the counter substrate are bonded together via a seal material so as to seal a liquid crystal in a spacing formed between the substrate and the counter substrate, and the protective circuit is provided inside the region where the seal material is applied.

According to the above described arrangement of the second liquid crystal display device embodiment, even if the insulating film is stripped off when removing a peripheral circuit previously mounted to the substrate, the stripping off of insulating film is arrested at the part where the seal material is applied, and the part of the insulating film that covers the protective circuit is not stripped. Therefore, malfunctions incurred from the protective circuit being exposed to the outside air can be prevented. Furthermore, as the protective circuit is not covered with the seal material, even if a malfunction such as a leakage, etc., occurred in the protective circuit, the protective circuit can be separated from the scanning lines or the signal lines, for example, through the use of a laser. Therefore, adverse effects on the display image of the liquid crystal display device can be avoided, thereby ensuring a proper display state of the liquid crystal display device.

The third embodiment of a liquid crystal display device, having basically the same structural arrangement as that of the first or second liquid crystal display device, is arranged such that the input terminals are connected to the scanning lines and to the signal line, and includes an insulating film portion which covers the protective circuit and an insulating film which covers a portion of the input terminals such that the overall insulating region is discontinuous.

According to this arrangement for the third liquid crystal display device embodiment, since the insulating films are formed discontinuously, even if the insulating film which covers the part of the input terminals is stripped, the insulating film which covers the protective circuit is not stripped. As a result, an inferior performance incurred as a result of the protective circuit being exposed to outside air can be prevented.

A fourth liquid crystal display device of the present invention includes a protective circuit formed on a substrate so as to connect adjoining scanning lines and/or adjoining signal lines, pixel electrodes provided on the substrate via the insulating film, and the input terminals connected to the signal lines and the scanning lines, wherein an insulating film which covers the protective circuit and an insulating film which covers a part of the input terminals are formed discontinuously.

According to the above described arrangement of this fourth embodiment liquid crystal display device, since the insulating films are formed discontinuously, even if the insulating film which covers a part of the input terminals is stripped, the insulating film which covers the protective circuit is not stripped. As a result, an inferior functioning of the protective circuit incurred as a result of the protective circuit being exposed to outside air can be prevented.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A liquid crystal display device, comprising:
    a substrate having formed thereon pixel electrodes;
    a counter substrate positioned so as to face said substrate;
    a seal material for bonding said substrate and said counter substrate together and to seal a liquid crystal in a space formed therebetween; and
    a protective circuit formed on said substrate so as to connect adjacent signal lines and/or adjacent scanning lines,
    wherein said protective circuit is located inside an outer edge of a bonding region on said substrate where said seal material is applied.

2. The liquid crystal display device as set forth in claim 1, wherein:
    said protective circuit is formed within the bonding region where said seal material is applied.

3. The liquid crystal display device as set forth in claim 1, wherein:
    said protective circuit is formed inside an inner edge of the bonding region where said seal material is applied.

4. The liquid crystal display device as set forth in claim 1, further comprising:
    a first insulating film which covers said protective circuit, and a second insulating film formed outside said first insulating film,
    wherein said first insulating film and said second insulating film are formed discontinuously.

5. The liquid crystal display device as set forth in claim 1, wherein:
    said protective circuit has a diode ring structure wherein two elements are connected in parallel and opposite directions.

6. The liquid crystal display device as set forth in claim 5, wherein:
    each of said two elements is a switching element wherein a source section and a gate section are short-circuited.

7. The liquid crystal display device as set forth in claim 1, wherein:
    said substrate is an active matrix substrate.

8. The liquid crystal display device as set forth in claim 7, comprising:
    a switching element formed on said active matrix substrate, for controlling a signal input to the pixel electrode,
    wherein said pixel electrodes are formed on the signal lines and the scanning lines via said insulating film, and
    said switching element and said pixel electrode, formed on said insulating film, are connected via a contact hole.

9. The liquid crystal display device as set forth in claim 1, wherein:
    said insulating film is an organic polymer thin film.

10. The liquid crystal display device as set forth in claim 9, wherein:

said organic polymer thin film is an acrylic resin.

11. A liquid crystal display device comprising:

a substrate having formed thereon pixel electrodes;

a protective circuit connecting adjacent signal lines and/or adjacent scanning lines arranged on said substrate, a first insulating film which covers said protective circuit, and a second insulating film formed outside said first insulating film, wherein said first insulating film and said second insulating film are formed discontinuously.

12. The liquid crystal display device as set forth in claim 11, wherein:

said protective circuit has a diode ring structure wherein two elements of a diode structure are connected in parallel and opposite directions.

13. The liquid crystal display device as set forth in claim 12, wherein:

each of said two elements is a switching element wherein a source section and a gate section are short-circuited.

14. The liquid crystal display device as set forth in claim 11, wherein:

said substrate is an active matrix substrate.

15. The liquid crystal display device as set forth in claim 14, comprising:

a switching element formed on said active matrix substrate, for controlling a signal input to the pixel electrode, wherein said pixel electrodes are formed on the signal lines and the scanning lines via said insulating film, and said switching element and said pixel electrode, formed on said insulating film, are connected via a contact hole.

16. The liquid crystal display device as set forth in claim 11, wherein:

said insulating film is an organic polymer thin film.

17. The liquid crystal display device as set forth in claim 16, wherein:

said organic polymer thin film is an acrylic resin.

18. A liquid crystal display device comprising:

a substrate having formed thereon pixel electrodes via an insulating film;

a protective circuit connecting adjacent scanning lines and/or adjacent signal lines arranged on said substrate, a first insulating film which covers said protective circuit, and a second insulating film formed outside said first insulating film, wherein said scanning lines and said signal lines are connected to corresponding input terminals, and said first insulating film and said second insulating film are formed discontinuously.

19. The liquid crystal display device as set forth in claim 18, further comprising:

a seal material for bonding said substrate and said counter substrate together and to seal a liquid crystal in a space formed therebetween, wherein said protective circuit is formed in a region on said substrate where the seal material is applied.

20. The liquid crystal display device as set forth in claim 18, further comprising:

a seal material for bonding said substrate and said counter substrate together and to seal a liquid crystal in a space formed therebetween, wherein said protective circuit is formed inside a region on said substrate where the seal material is applied.

* * * * *